US011931609B2

(12) United States Patent
Ahn

(10) Patent No.: US 11,931,609 B2
(45) Date of Patent: Mar. 19, 2024

(54) DEVICE FOR PREVENTING THE SPREAD OF FOREST FIRE

(71) Applicant: Kwangho Ahn, Seongnam-si (KR)

(72) Inventor: Kwangho Ahn, Seongnam-si (KR)

( * ) Notice: Subject to any disclaimer, the term of this patent is extended or adjusted under 35 U.S.C. 154(b) by 115 days.

(21) Appl. No.: 17/302,670

(22) Filed: May 10, 2021

(65) Prior Publication Data

US 2021/0379430 A1 Dec. 9, 2021

(30) Foreign Application Priority Data

Jun. 4, 2020 (KR) ........................ 10-2020-0067835

(51) Int. Cl.
*A62C 3/02* (2006.01)
*A62C 2/06* (2006.01)

(52) U.S. Cl.
CPC .............. *A62C 3/0257* (2013.01); *A62C 2/06* (2013.01)

(58) Field of Classification Search
CPC ..... A62C 2/06–248; A62C 35/10; A62C 3/02; A62C 3/0257; A62C 3/0264; B65D 1/40; B65D 25/14; B32B 2307/3065; B32B 2307/306; F17C 2203/067; F17C 2209/2154; F17C 1/16; F17C 2203/0619; Y10S 428/92; Y10S 428/921
USPC ................... 220/62.19, 62.22, 62.11; 169/43
See application file for complete search history.

(56) References Cited

U.S. PATENT DOCUMENTS

| | | | | |
|---|---|---|---|---|
| 7,717,187 | B1 * | 5/2010 | Miller | A62C 2/10 442/302 |
| 2015/0192251 | A1 * | 7/2015 | Tupper | B65D 25/14 156/196 |
| 2020/0238113 | A1 * | 7/2020 | Glaser | A62C 3/0257 |

FOREIGN PATENT DOCUMENTS

| | | | | |
|---|---|---|---|---|
| GB | 2294105 * | | 4/1996 | F42D 5/045 |
| KR | 20-2000-0021255 | U | 12/2000 | |
| KR | 10-0851400 | B1 | 8/2008 | |
| KR | 10-2015-0058138 | A | 5/2015 | |

* cited by examiner

*Primary Examiner* — Qingzhang Zhou
*Assistant Examiner* — Juan C Barrera
(74) *Attorney, Agent, or Firm* — INVENSTONE PATENT, LLC

(57) ABSTRACT

A forest fire spread prevention device as an automatic fire extinguishing device for a forest fire may suppress an occurrence of property loss and loss of lives by blocking the forest fire in the middle so that it does not spread to nearby private houses when a forest fire occurs. The forest fire spread prevention device can include a burlap bag-shaped outer skin member which is woven with a thermoplastic plastic tape having a melting point of 160 to 280° C. as a weft and a warp; and an inner skin member of a cylindrical container which is accommodated in the outer skin member and formed in a film shape prepared by extruding a thermoplastic plastic material having a thickness of 15 to 50 microns and a melting point of 110 to 130° C. in a cylindrical shape, and has an inner space filled with water.

11 Claims, 4 Drawing Sheets

ENLARGED CROSS-SECTIONAL VIEW OF PART B

TEXTURE ENLARGED VIEW A

DEVICE FOR PREVENTING THE SPREAD OF FOREST FIRE

RELATED APPLICATIONS

This application claims priority to Korean Patent Application No. 10-2020-0067835, filed on Jun. 4, 2020 in the Korean Intellectual Property Office, the entire disclosure of which is incorporated herein by reference.

BACKGROUND

1. Field

The present disclosure relates to a device for preventing the spread of forest fire (briefly, "forest fire spread prevention device") which prevents a forest fire from spreading greatly or a forest fire from spreading to a residential area near the fire site when a fire such as a large forest fire occurs.

2. Description of the Related Art

Generally, in the dry season when humidity is low because there is no rain or snow, for example, in spring, trees in the mountains and fields dry up, their moisture content is low, and there are many flammable materials such as dry fallen leaves and branches, which act as tinder. In addition, since a lot of strong winds rich in oxygen supply blow, even small embers often spread easily into large forest fires. (Forest fires may be referred as wildfires, wildland fires, or bushfires). Such forest fires are caused mainly by artificial causes, such as the carelessness of hikers or nearby residents around a mountain, especially when throwing cigarette butts or setting fires to remove weeds for farming, and the generated forest fires cause large-scale damage.

However, forest fires have poor accessibility due to their rugged topographical characteristics, and water supply for fire extinguishment is challenging, and fires easily spread because they occur in places where there are many difficulties in extinguishing. Due to this reason, it is best to prevent forest fires from occurring.

To this end, it is effective to prohibit the use of flammable materials near flames or in the forest for prevention of forest fires during a dry season. Therefore, the Korean Forest Law defines the prohibition of carrying a lighter or match to prevent forest fires for the protection of forests, the setting of a warning period for forest fires, and the setting of a period for prohibition of entering mountains.

In addition, forest owners and managers should take necessary measures to prevent and extinguish forest fires, and prevent people from setting fires in forests or areas close to the forests without permission, or entering mountains with a lighter or match.

If a permit is obtained, it is defined in the Forest Law to install a facility to prevent forest fires in advance, and to notify the fact to nearby forest owners and managers.

Other preventive measures include setting up a fire-arresting line, creating a forest zone for prevention the spread of fire, mowing and pruning of lower branch in young forests, maintenance of forest roads and sidewalks, installation of water storage facilities, smoking places, keeping out of mountains, and establishment of an early detection system through fire monitoring networks or patrols, etc.

In addition, it is necessary to organize and train fire brigades and to maintain facilities for notifying occurrences of fire.

As a fire extinguishing method, a direct fire extinguishing method, in which soil, water, or a fire extinguishing agent is sprayed on the fire site, or a fire being extinguished directly by hitting it with a device such as a branch of a live tree or a rake, is commonly used. However, if the burning speed is high, it is not possible to approach the flame due to danger, and therefore, an indirect fire extinguishing method, in which the forests in the direction of burning are cut down to remove combustibles, and a fire-arresting line is established to stop the spread of the fire, is simultaneously implemented. In the case of large fires, they are mainly dealt with by indirect fire extinguishing, but in some cases, a counter fire is set to extinguish the fire.

A fire truck used to extinguish forest fires is unsuitable for driving in mountainous terrain due to the structure of the vehicle, such that it is difficult to enter the fire site. In addition, due to the structure of firefighting equipment such as nozzles and hoses, it is not suitable to perform firefighting work in forest areas, and since a large amount of water with a low pressure is sprayed, water is wasted severely, such that it is unsuitable for firefighting or spraying for a long period of time.

In addition, chemical powder type fire extinguishers commonly used in fires such as buildings are intended to extinguish fires in the early stage of the fire, and mainly use a method of spraying powder fire extinguishing agents using nonflammable high-pressure gas (e.g., carbon dioxide, nitrogen). Such a fire extinguisher is usually placed in a certain place and used at the beginning of a fire. However, the fire extinguisher has disadvantages that the structure is complicated because a fire extinguisher container should be provided with a separate pressure gas cylinder therein, and it is difficult for a user to manipulate it. In particular, in the case of forest fires, the place where the fire extinguisher is installed and the ignition point are different, such that it is not suitable for fire extinguishment of a forest fire that spreads over a large area.

For this reason, in recent years, when a forest fire occurs, fire fighters put water or a fire extinguishing agent in a tank and go to the fire area using a firefighting helicopter, and then drop the water or fire extinguishing agent into the fire site from the air to extinguish the fire.

However, in the case of extinguishing the fire with water stored in a water tank by the firefighting helicopter, the amount of storage in the water tank is limited and insufficient to extinguish the fire, thus it is necessary to repeat a process of filling the water tank with water and then moving to the fire site to extinguish the fire. At this time, there are cases where water is filled into the water tank in the valley near the fire area to extinguish the fire quickly, but due to the nature of the valley, there are various obstacles (for example, transmission towers, etc.), and an accident of a firefighting helicopter crash due to a gust of wind blowing in the fire site frequently occurs. In addition, there are many cases where water or fire extinguishing agent falling in the air is not accurately dropped on the fire site as it is scattered by strong winds. In particular, since the flame spreads in all directions due to the nature of the forest fire, it may be difficult to extinguish the fire at all forest fire boundaries. Therefore, first of all, it is necessary to block the spread of forest fires to the private houses, etc. However, if the forest fire is close to the private houses, evacuating residents is a priority for safety. Therefore, although it is very important to block the forest fires from spreading to the private houses, there is no clear blocking method, and the forest fires cause enormous property losses.

Korean Patent Registration Publication No. 10-1156335 discloses the related technology.

The disclosure of this section is to provide background information relating to the invention. Applicant does not admit that any information contained in this section constitutes prior art.

SUMMARY

In consideration of the above-mentioned circumstances, it is an aspect of the present invention to provide a forest fire spread prevention device as an automatic fire extinguishing device for a forest fire that may suppress an occurrence of property loss and loss of lives by blocking the forest fire in the middle so that it does not spread to nearby private houses when a forest fire occurs.

According to an aspect of the present invention, there is provided a device for preventing the spread of forest fire ('forest fire spread prevention device'), the device including: a burlap bag-shaped outer skin member which is woven with a thermoplastic plastic tape having a melting point of 160 to 280° C. as a weft and a warp; and an inner skin member of a cylindrical container which is accommodated in the outer skin member and formed in a film shape prepared by extruding a thermoplastic plastic material having a thickness of 15 to 50 microns and a melting point of 110 to 130° C. in a cylindrical shape, and has an inner space filled with water.

According to the above-described configuration, the outer skin member of the forest fire spread prevention device is prepared by extruding a thermoplastic plastic material having a high melting point so as to withstand heat well in case of the fire to obtain tapes, and intersecting and weaving the obtained tapes as a weft and a warp, and the inner skin member is formed in a film-shaped container obtained by extruding a material having a relatively low melting point in a cylindrical shape. Therefore, if the forest fire spread prevention device is installed on the ground like a fence in an area to block the spread of a forest fire, when the fire approaches the outer skin member to heat the same, the heat is transferred to the inner skin member, and the inner skin member having a relatively low melting point is melted first to form holes. At the same time, the water for fire extinguishing is ejected to an outside through the holes formed by the melting and gaps provided in a mesh texture of the outer skin member to extinguish the surrounding fire and cool the outer skin member, thereby preventing the fire from spreading beyond the forest fire spread prevention device.

According to an embodiment of the present invention, the thermoplastic resin forming the outer skin member may have a denier (D) of 750 or more, and the inner skin member may have a thickness of 20 to 40 microns and a melting point of 120 to 130° C.

In addition, according to embodiments of the present invention, in a state in which the inner skin member of the forest fire spread prevention device is filled with water, an end of the inner skin member or a joined end of the inner and outer skin members may be sealed by knot tying treatment.

Further, according to embodiments of the present invention, in a state in which the inner skin member of the forest fire spread prevention device is filled with water, the end of the inner skin member or the joined end of the inner and outer skin members may be sealed by thermal bonding treatment.

Further, according to embodiments of the present invention, the outer skin member may be subjected to flame-retardant treatment, and the inner skin member may not be subjected to flame-retardant treatment or the remaining portions except for portions selected as holes for spraying water may be subjected to flame-retardant treatment.

Furthermore, according to embodiments of the present invention, a hose connection port is provided on one side of the forest fire spread prevention device, such that water is supplied or replenished to the inner space of the inner skin member through a hose from a water supply at the time of the forest fire.

According to embodiments of the present invention described above, if a forest fire blocking line is set at the site of the forest fire and a long cylindrical forest fire spread prevention device is installed on the ground like a fence at the set position, the forest fire spreads and approaches the cylindrical forest fire spread prevention device and the heat is first transferred to the outer skin member. Thereafter, the heat is transferred to the inner skin member, and when the temperature reaches the melting point of the inner skin member, the portion of the inner skin member to which the heat is transferred is melted to form holes, and the water under a pressure acting on the outer skin member through the holes is ejected to an outside through the holes and gaps provided in the woven texture of the outer skin member to extinguish the fire around the forest fire spread prevention device. Therefore, since the forest fire is automatically blocked from spreading beyond the cylindrical member as a blocking line, the fire is automatically detected to operate the device even if a person is not at the fire site. Accordingly, it is possible to effectively prevent the spread of forest fires while suppressing an occurrence of property loss and loss of lives.

In addition, according to embodiments of the present invention, the remaining portions of the inner skin member except for the portions selected as holes for spraying water are subjected to flame-retardant treatment, such that only the portions selected so as not to be subjected to flame-retardant treatment are melted to form water spray holes when exposing to the fire. Therefore, it is possible to stably maintain the spray of water by preventing a phenomenon in which the texture of the inner skin member is melted all at once.

In addition, in a state in which the inner skin member of the forest fire spread prevention device is filled with water, when sealing the end of the inner skin member or the joined end of the inner and outer skin members by knot tying treatment, since the end can be more easily and rapidly sealed than a sealing method by high-frequency bonding treatment, manufacturing costs may be greatly reduced.

Further, since the hose connection port is provided on one side of the forest fire spread prevention device, water is supplied or replenished to the inner space of the inner skin member through a hose from a water supply at the time of the forest fire. Furthermore, it is convenient that the inner skin member is usually kept in an empty state, and water can be supplied from the water supply when the forest fire occurs.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF EMBODIMENTS

Figure 1:
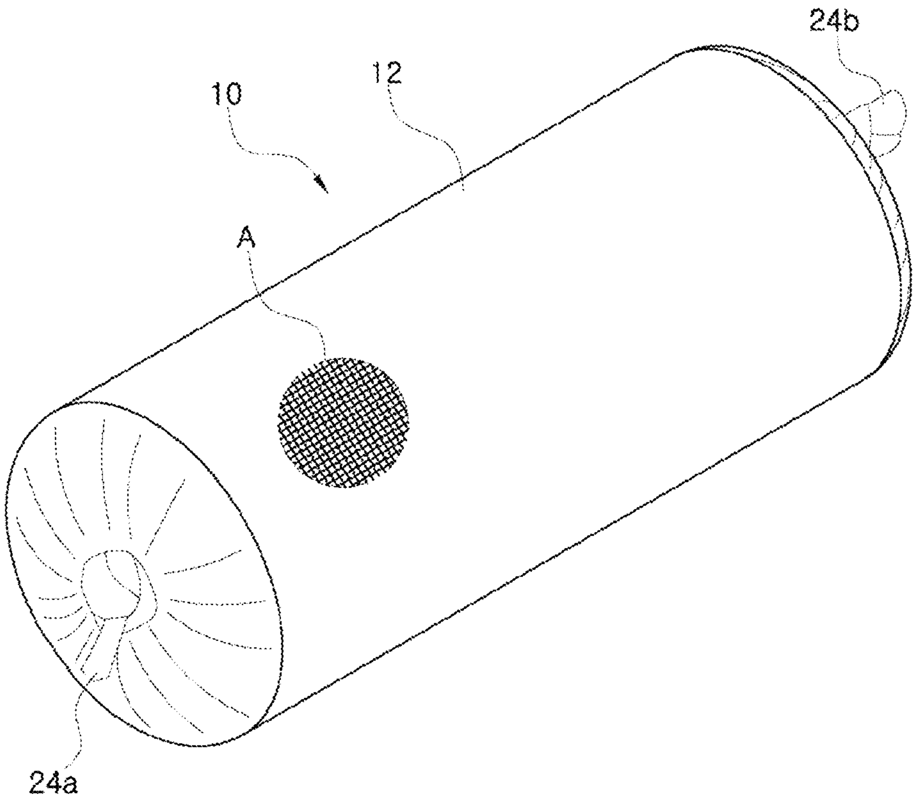
FIG. 1 is a perspective view illustrating a forest fire spread prevention device according to embodiments of the present invention.

Specific structural or functional descriptions of embodiments according to the concept of the present invention disclosed in the present specification are examples only for the purpose of describing the embodiments according to the concept of the present invention, and the embodiments according to the concept of the present invention may be implemented in various forms, and the present invention is not limited to the embodiments described herein.

Since the embodiments according to the concept of the present invention can apply various changes and may have various forms, embodiments are illustrated in the drawings and will be described in detail in the present specification.

However, the present invention is not intended to limit to the embodiments according to the concept thereof, and includes all changes, equivalents, or substitutes included in the spirit and scope of the present invention.

It should be understood that when a component is referred to as being “connected to” or “coupled to” another component, it can be directly connected or coupled to the other component intervening another component may be present. In contrast, it should be understood that when a component is referred to as being “directly connected to” or “directly coupled to” another component, there is no intervening component present.

The terminology used herein is for the purpose of describing particular embodiments only and is not intended to limit the present invention thereto.

As used herein, the singular forms “a,” “an” and “the” are intended to include the plural forms as well, unless the context clearly indicates otherwise. It will be further understood that the terms “comprises,” “comprising,” “includes” and/or “including,” when used herein, specify the presence of stated features, integers, steps, operations, elements, and/or components, but do not preclude the presence or addition of one or more other features, integers, steps, operations, elements, components, and/or groups thereof.

Unless otherwise defined, all terms including technical and scientific terms used herein have the same meaning as commonly understood by one of ordinary skill in the art to which the present invention belongs.

It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In addition, it should be taken into account that the thickness of the fibrous texture is exaggerated in the drawings.

Hereinafter, a specific technical configuration of the present invention will be described with reference to the accompanying drawings.

Figure 2:
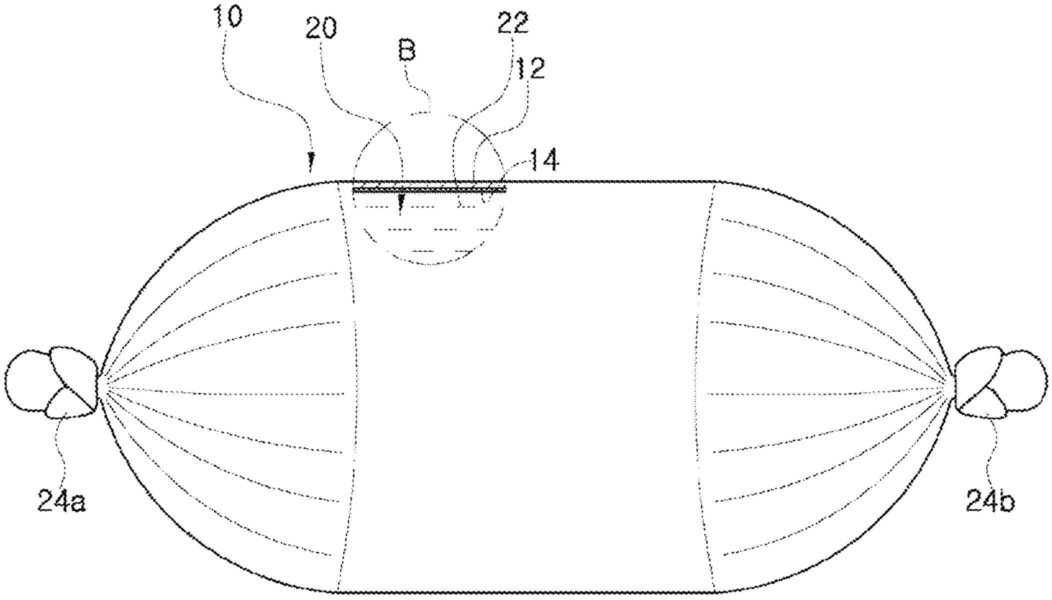
FIG. 2 is a front view with a partially cutaway section illustrating the forest fire spread prevention device according to embodiments of the present invention.
Figure 3:
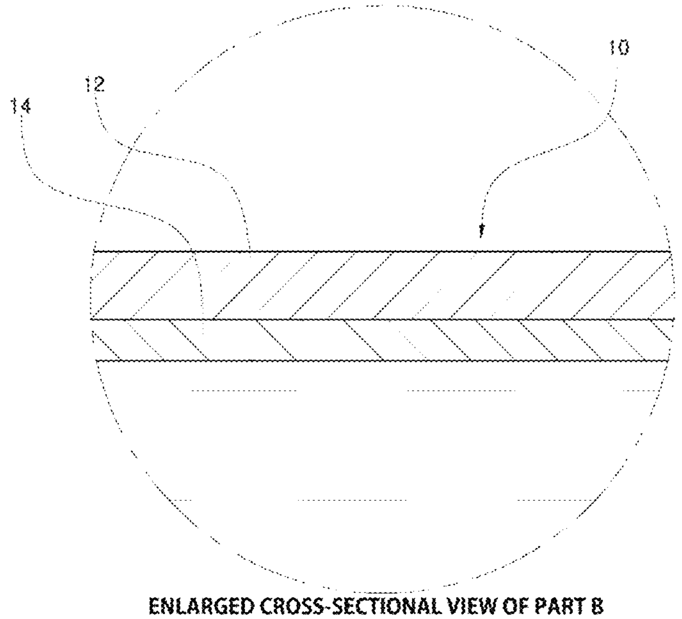
FIG. 3 is an enlarged cross-sectional view of part B in FIG. 2.

First, the present invention will be described with reference to FIGS. 1 to 5. FIG. 1 is a perspective view illustrating a forest fire spread prevention device according to the present invention, and FIG. 2 is a front view with a partially cutaway section illustrating the forest fire spread prevention device according to the present invention.

In the drawings, the forest fire spread prevention device of the present invention is generally denoted by a reference numeral 10, and the forest fire spread prevention device 10 includes an outer skin member 12 and an inner skin member 14.

The outer skin member 12 used herein is a bag made of a thermoplastic plastic material commonly used to store and move grains of cereal crops such as rice or plastic raw materials.

Thermoplastic plastic is a plastic material that can be melt-processed by various methods such as injection molding, extrusion molding, blow molding, thermoforming, etc., and has excellent formability, thus to be widely used in various fields such as packaging films, photographs, and magnetic tapes, and in particular, in a bag for grains or plastic raw materials, etc. As will be described below, the outer skin member 12 of the present invention has very high strength, toughness, and no cracking due to characteristics of a tape woven texture, and has a large protective effect for a body (inner skin member) contained therein.

The thermoplastic plastic material may include: (1) polyolefin plastics such as polyethylene (PE) (melting point 105 to 120° C.), ethylene copolymer, polypropylene (PP) (melting point 165 to 186° C.), propylene copolymer, poly(4-methyl-1-pentene) (TPX), etc.; (2) polyester plastics such as poly(ethylene terephthalate) (PET) (melting point 265° C.), PET nonwoven fabric (melting point 200° C. or higher), poly(butylene terephthalate) (PBT) (melting point 220° C.); (3) polyether plastics such as polyacetal, poly(phenylene oxide (PPO), polysulfone (PSF), polyethersulfone (PES), poly(phenylene sulfide) (PPS) (melting point 290° C.), polyetheretherketone PEEK (melting point 340° C.); (4) polyvinyl plastics such as poly(vinyl chloride) (PVC) (melting point 224° C.), poly(vinylidene chloride) (PVDC) (melting point 177° C.), polyvinylidene fluoride (PVDF) (melting point 172° C.), poly(vinyl acetate) (PVAC), poly(vinyl alcohol) (PVAL), poly(vinyl acetal), polystyrene (PS) (melting point 280° C.), ABS resin, poly(methyl methacrylate) (PMMA) (melting point 135° C.), fluorine resin; and the like. As the outer skin member 12, a material having a melting point of 150° C. or lower is not preferable, and thus materials having a relatively high melting point of 150° C. or higher, preferably, 160 to 280° C., and more preferably, 180 to 280° C. are used.

The outer skin member 12 is manufactured of a tape made in a film or a composite film using, as a main component, at least one resin among components having a high melting point and ease of being formed in a film form, such as polypropylene (PP) (melting point 165 to 186° C.), polymethylpentene (melting point 230 to 240° C.), ethylene copolymer (melting point 260° C.), PET (melting point 265° C.), PET nonwoven fabric (melting point 200° C. or higher), poly(butylene terephthalate) (PBT) (melting point 220° C.), poly(vinyl chloride) (PVC) (melting point 224° C.), poly (vinylidene chloride) (PVDC) (melting point 177° C.), vinylidene fluoride (PVDF) (melting point 172° C.), EVOH (melting point 171° C.), and poly(vinyl acetal). Preferably, a flame-retardant resin or a resin coated with a flame-retardant material (flame retardant) is used.

Figure 4:
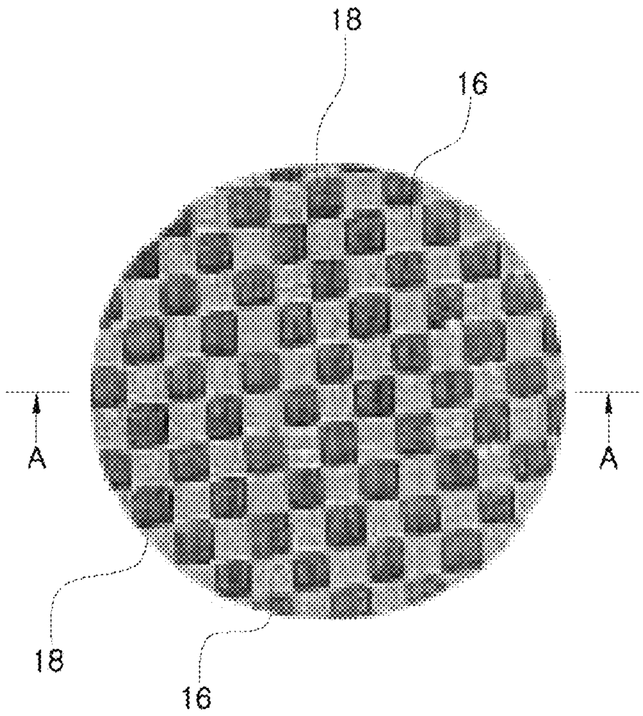
FIG. 4 is a texture enlarged view A illustrating a woven texture of an outer skin member of the forest fire spread prevention device according to embodiments of the present invention.

As shown in the texture enlarged view (A) of FIG. 4, a fiber woven fabric obtained by weaving the film of the material exemplified above as a weft tape 16 and a warp tape 18 is used. In an embodiment of the present invention, the weft tape 16 and the warp tape 18 are obtained by weaving a film having a denier (D) of 750 to 950, and a width of 1 to 4 mm. Preferably, a tape having a denier of 850 is woven in a size of 8×8 or more (thickness does not matter so much), and recycled PP having a melting point of 165° C. or higher was used as a raw material.

In a more specific embodiment, the outer skin member 12 of the present invention was produced using a resin (melting point of about 165° C.) which has medium flowability, high molecular weight distribution and stiffness among extruded products, and is based on Lotte Y130 (trade name, PP-based resin) series having a melt index of 4.0 as measured by ASTM D1238.

Figure 5:
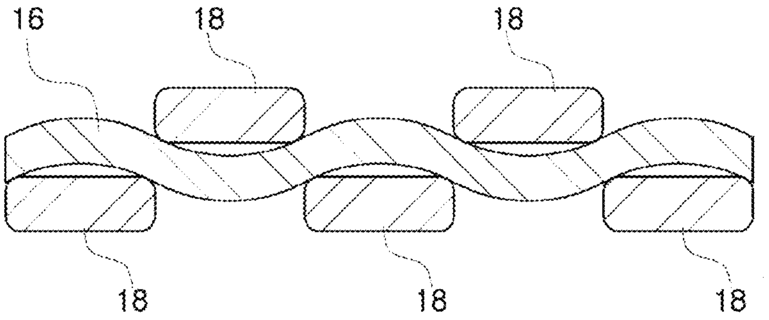
FIG. 5 is a cross-sectional view taken on line A-A of FIG. 4.

FIGS. 4 and 5 are views illustrating a texture of the outer skin member 12 woven using the weft tape 16 and the warp tape 18, which have a width of 2.5 mm, respectively. Plain-woven meshes, in which wefts and warps are intersected one by one, that is, one-to-one woven meshes, or twill-weave meshes, in which three or more warp and weft threads are intersected up and down, are woven or both ends thereof are rolled and sewn together, thus to form a cylindrical bag with a space therein.

As a material of the outer skin member 12, a flame-retardant material that is resistant to fire is more preferably used. Herein, it is preferable that an outer surface thereof is subjected to flame-retardant coating with a commonly known flame-retardant material, such that the outer skin member does not easily melt even when exposed to the fire.

Figure 6:
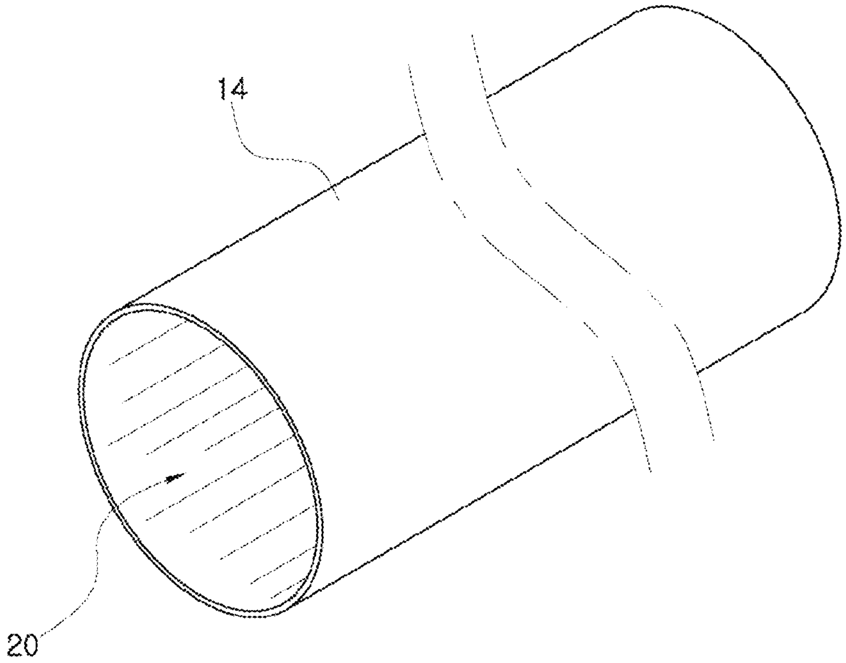
FIG. 6 is a perspective view illustrating a film-shaped container in a state in which the inner skin member of the forest fire spread prevention device according to embodiments of the present invention is extruded.

FIG. 6 is a perspective view illustrating the inner skin member 14 accommodated in the outer skin member of the present invention. The inner skin member 14 is formed as a film-shaped container in which a thermoplastic resin having a low melting point, for example, a melting point of 130° C. or lower, is seamlessly and continuously extruded into a cylindrical shape over a circumferential direction. The inner skin member 14 has an inner space 20 filled with a fire extinguishing agent, for example, water 22 for extinguishing. Unlike the outer skin member 12 in which the weft tape 16 and the warp tape 18 are intersected with each other and air is communicated through gaps in the woven texture, the inner skin member is extruded into a form of a film, such that water cannot pass through the film texture. In addition, when the inner skin member 14 is accommodated in the outer skin member 12 and the inner space 20 is filled with water, the inner skin member 14 expands, and then as shown in the enlarged cross-sectional view of FIG. 3, the outer skin and inner skin members 12 and 14 are in close contact with each other. Accordingly, the inner skin member 14 is protected by the outer skin member 12 surrounding it.

The inner skin member 14 is made of a thermoplastic plastic (resin) that is easily extruded into a film form, and a resin having a melting point of 140° C. or lower, such as polyethylene (PE), poly(methyl methacrylate) (PMMA) (melting point 135° C.), and ethylene vinyl acetate (EVA) (melting point 88° C.), and the like may be used. Preferably, as a film having good formability, excellent strength and flexibility, polyethylene (PE) having a low melting point of about 130° C. or lower and ease of being formed is used. As the polyethylene, low density polyethylene (LDPE) (melting point 105 to 115° C.) or linear low density polyethylene (LLDPE) (melting point 110 to 125° C.) is used.

However, it is not limited to the above material, and even if it has a high melting point as a single component, as long as it contains other heterogeneous components and can be extruded into a film shape, and satisfies conditions having a melting point of 140° C. or lower, a PE or PP-based resin may be used as the inner skin member 14 regardless of the series. Similarly, as long as it is a plastic material having a melting point of 160° C. or higher, preferably 180° C. or higher, the material can be used as the outer skin member 12. Therefore, in the present invention, the material series of the outer skin and inner skin members 12 and 14 are not necessarily different from each other, and in the case of a material having different melting point of at least 30° C. or higher, preferably 50° C. or higher, a material having a high melting point is used as the outer skin member 12, and a material having a relatively low melting point is used as the inner skin member 14. Meanwhile, unlike the outer skin member 12, the inner skin member 14 should be melted when the fire approaches to form holes, thus it is preferable to use a flame-retardant material or a material to which flame-retardant treatment is not subjected.

When performing the flame-retardant treatment, only the remaining portions are subjected to flame-retardant treatment so that a plurality of small holes are left in a matrix shape at a predetermined interval. Therefore, when heat of fire is transmitted to the inner skin member 14, it is advantageous that only the holes, to which flame-retardant treatment is not subjected, are melted to form small holes, and a cylindrical body of the device is maintained as it is. When manufacturing the device in this way, since the inner skin member uses a material having a low melting point, the material corresponding to the holes thereof is easily melted under a relatively low temperature to serve as water jet holes, and the remaining portions, to which the flame-retardant treatment is subjected, are not melted despite the low melting point, such that the cylindrical body is maintained as it is. Therefore, it is possible to stably spray water through the holes.

In the present invention, the inner skin member 14 has a thickness of 60 microns or less, and preferably, a thickness of 40 microns or less (an optimal thickness is 10 to 40 microns) so that, when subjected to heat of about 100 to 130° C., the corresponding portions are melted to form holes. As a film raw material for the inner skin member 14, for example, Lotte SFC750(trade name), which is a general-purpose cast polypropylene (CPP) film having a melting index (MI) of 7.0 according to the measurement method of ISO 113 and a melting point of 130° C., may be used. Under such melting temperature conditions, it is preferable that the outer skin member 12 has a high melting point of 30° C. or higher.

Since the inner skin member 14 of the present invention is a film material, when it interferes with other objects, holes may be easily formed, and cracks may spread to other portions of the body. However, since the inner skin member is protected by the outer skin member 12, which is strong and tough and hardly generates cracks and crack propagation, there is an advantage of exerting complementary benefits due to different texture characteristics.

The forest fire spread prevention device of the present invention manufactured as described above is installed in a place set as a diffusion blocking line, for example, surrounding private houses in contact with a mountain like a fence during normal times or when a forest fire occurs. Before installation, water for fire extinguishing is first filled into the inner skin member. In order to fill with water, one end of each of the inner and outer skin members forming the bag is tied to form a knot 24*a*, and in this state, water is supplied to the inner space 20 of the inner skin member 14 through the opened other end. In that state, when the opened ends are tied to form the knot 24*b* to seal the interior, installation of the device is completed.

In this state, the forest fire spread prevention device 10 becomes an elongated cylindrical body like a balloon in the shape of a rod. When placing the device on the ground at the point where the spread of wildfire is to be blocked, it is in close contact with the ground by its own weight and a gap with the ground disappears, thereby forming a line of defense to prevent the spread of the forest fire.

Figure 7:
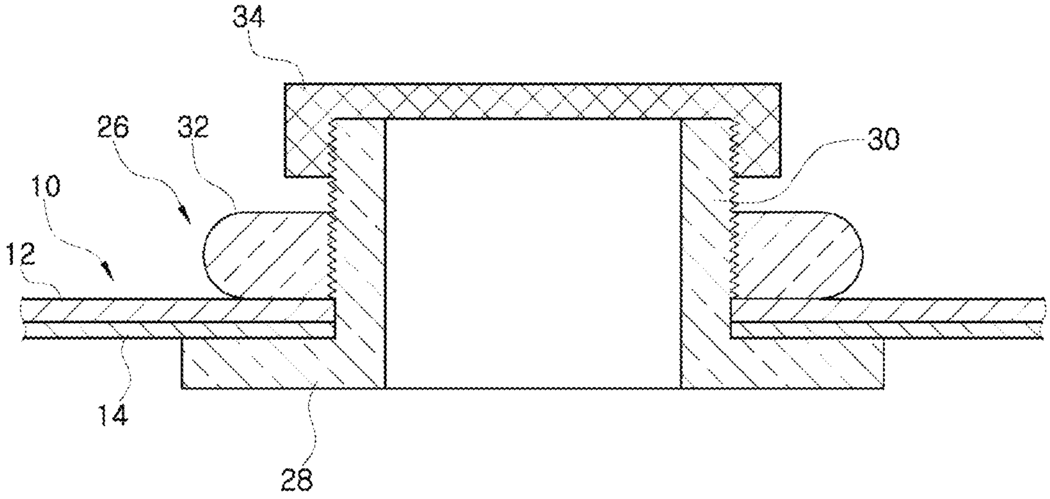
FIG. 7 is a cross-sectional view illustrating a configuration of a forest fire spread prevention device according to a modified embodiment of the present invention.

FIG. 7 is a cross-sectional view illustrating a configuration of a forest fire spread prevention device according to a modified embodiment of the present invention. In the embodiment shown in FIG. 7, the forest fire spread prevention device 10 is separately provided with a hose connection port 26 through which water as a fire extinguishing agent can be injected into the inner skin member 14 in a state in which both ends of the bag are tied to form knots 24*a* and 24*b*.

The hose connection port 26 includes: a flange 28 which is in close contact with an inner surface of the inner skin member 14 and has a central hole; a hollow threaded part 30 which extends from the flange 28 at a right angle and penetrates the inner skin member 14 and the outer skin member 12 to protrude to an outside; and a nut-shaped cap 32 which is screwed to the threaded part 30 to compress and seal the outer and inner layers 12 and 14 with respect to the flange 28. A water supply hose is connected to the remaining threaded part 30 after the cap 32 is fastened in the form of a nipple, and the water supply hose is connected to the water supply facility again, then the water supplied from the water supply system is filled in the inner space 20 through the water supply hose and hose connection port 26.

This water supply facility is maintained in the state of being connected to the forest fire spread prevention device 10 until an occurrence of the forest fire, such that when the water contained in the skin member 14 leaks to the outside, it is always possible to replenish water. Alternatively, regardless of the fire, water may be filled in the forest fire spread prevention device in advance, or water may be filled at the site when a fire occurs, then the water supply hose may be separated, and a cover 34 may be fastened to seal the inner space.

When a forest fire occurs, the forest fire spread prevention device of the present invention is placed on the ground along a blocking line (defense line) in an area (or private houses near a mountain or in the mountain) set as the spread blocking line of forest fires to form a fence. In the area where such a forest fire spread prevention device port is installed, when a fire approaches the forest fire spread prevention device 10 to be exposed to the fire, even if there is no fire fighter or resident, the forest fire spread prevention device 10 is automatically operated to spray water, such that the surrounding fire is extinguished through the following process.

Figure 8A:
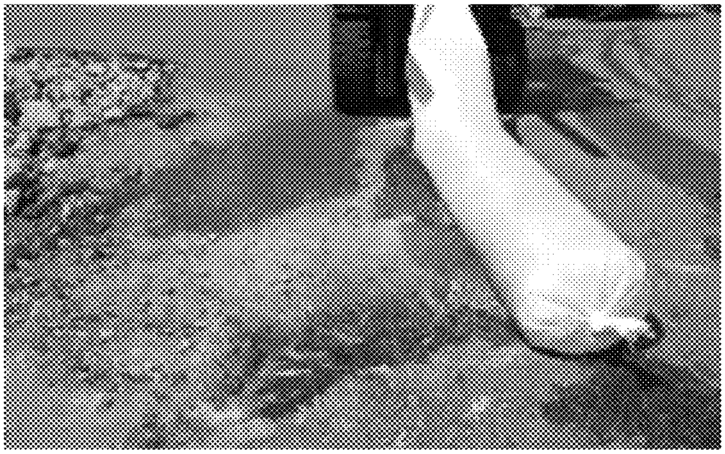
FIGS. 8A to 8C are photographs of still images illustrating an operation state of the forest fire spread prevention device according to embodiments of the present invention at the time of actual fire.
Figure 8B:
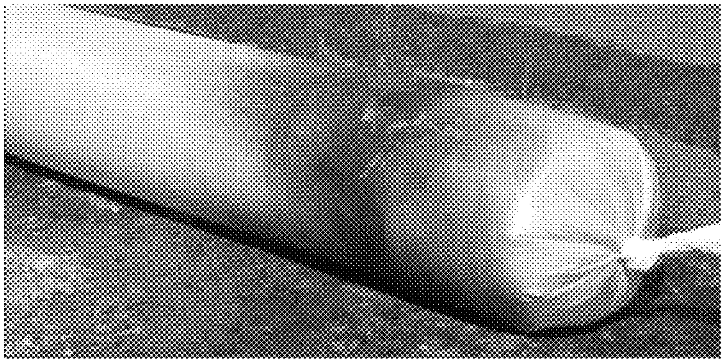
Figure 8C:
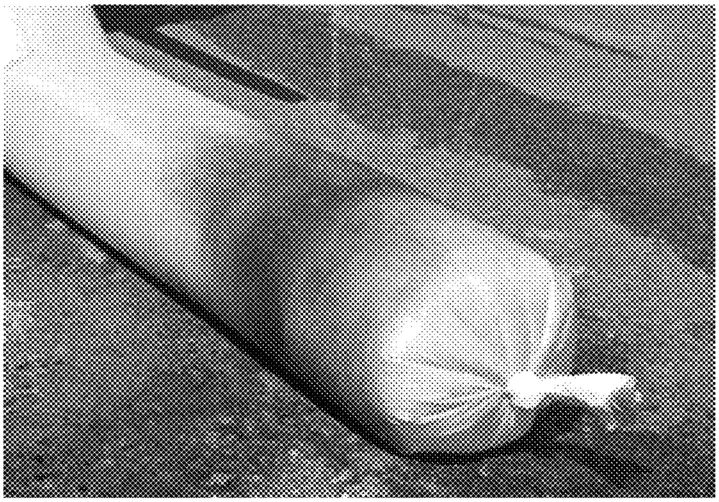

FIGS. 8A to 8C are photographs of still images illustrating an operation state of the forest fire spread prevention device according to the present invention at the time of actual fire. FIG. 8A is a photograph illustrating a scene in which a forest fire spreads and reaches the forest fire spread prevention device, FIG. 8B is a photograph illustrating a state in which the forest fire is transferred and burned on the surface of the outer skin member, and in this state, the heat of the fire transferred to the outer skin member 12 is transmitted to the inner skin member 14, then the inner skin member 14 which has a low melting point and is not subjected to flame-retardant treatment is melted to form holes, and water is ejected through the holes and gaps provided in the weaving texture of the outer skin member 12 to extinguish and suppress the surrounding fire and fire on the surface of the outer skin member 12, and FIG. 8C is a photograph illustrating a state in which the fire in the surrounding area including the forest fire spread prevention device has been suppressed by the ejected water.

Herein, the reason why the outer skin member 12 does not melt, even if the surface of the outer skin member 12 is on fire, is that the outer skin member 12 is made of a material having a high melting point and the outer skin member 12 is subjected to flame-retardant treatment. On the other hand, the inner skin member 14 is made of a material having a low melting point, and is not subjected to flame-retardant treatment (or only the remaining portions are subjected to flame-retardant treatment except for the hole sites selected as the portion to be melted for water spraying). Therefore, when reaching 110 to 130° C., which is a temperature of the melting point, the inner skin member 14 is melted, or the portions corresponding to the holes to be formed in the inner skin member 14, to which the flame-retardant treatment is not subjected, are melted to form holes. Next, the water filled in the inner space 20 is sprayed to the outside through the holes formed by melting and the gaps between the weaving textures of the outer skin member 12 to extinguish the fire transferred to the outer skin member 12 and the surrounding fires. Therefore, it is possible to prevent the spread of forest fires beyond the forest fire spread prevention device 10 (see the photograph of FIG. 8B).

Thereby, there is no need for firefighters or residents to guard the spread blocking line of forest fires, and even if they evacuate to a safe zone, the inner skin member 14 is melted by the heat reaching the forest fire spread prevention device 10 to form holes and automatically spray water, such that the surrounding fires are extinguished and suppressed (see the photograph of the state in which the fire is extinguished by the spraying stream of water in FIG. 8C).

The above description is only for embodiments of the present invention, and is not intended to limit the present invention to any form, and simple modifications, equivalent changes or alterations made by those skilled in the art using the technical content disclosed above fall within the scope of the present invention.

DESCRIPTION OF REFERENCE NUMERALS

10: Forest fire spread prevention device
12: Outer skin member
14: Inner skin member
16: Weft tape
18: Warp tape
20: Interior space
22: Extinguishing agent (water)
24 (24*a*, 24*b*): Knot
26: Hose connection port
28: Flange
30: Threaded part
32: Cap
34: Cover

What is claimed is:

1. A device for preventing the spread of forest fire, the device comprising:

an outer skin member which is woven with a thermoplastic plastic tape having a melting point of 160 to 280° C. as a weft and a warp, the outer skin member having a texture obtained by weaving a weft tape and a warp tape; and an inner skin member of a cylindrical container which is accommodated in the outer skin member and formed in a film shape prepared by extruding a thermoplastic plastic material having a thickness of 15 to 50 microns and a melting point of 110 to 130° C., the cylindrical container having an inner space configured to be filled with water, wherein the texture of the outer skin member is a plain-woven mesh in which the weft tape and the warp tape are intersected one by one, the plain-woven mesh forming a cylindrical bag with a space to accommodate the inner skin member, wherein the inner skin member is seamlessly and continuously extruded into a cylindrical shape over a circumferential direction, wherein the inner skin member is divided into a first portion that is subject to flame-retardant treatment and a second portion that is not subject to flame-retardant treatment, and wherein, when the melting point of the inner skin member is reached, the second portion is melted to form a plurality of holes in a matrix shape at a predetermined interval for spraying the water from the inner skin member, and the first portion is not melted, such that the inner skin member is maintained as a cylindrical body while the water is sprayed through the plurality of holes serving as water jets.

2. The device according to claim 1, wherein the thermoplastic plastic tape forming the outer skin member has a denier (D) of 750 or more, wherein the inner skin member has a thickness of 20 to 40 microns and a melting point of 120 to 130° C., and wherein the melting point of the outer skin member and the melting point of the inner skin member exhibit a temperature difference of 50° C. or more.

3. The device according to claim 1, wherein, in a state in which the inner skin member is filled with water, an end of the inner skin member is sealed by a heat bonding treatment or a knot tying treatment.

4. The device according to claim 1, wherein, in a state in which the inner skin member is filled with water, a joined end of the inner and outer skin members is sealed by a heat bonding treatment or a knot tying treatment.

5. The device according to claim 1, wherein the outer skin member is subjected to flame-retardant treatment, and wherein the inner skin member is not subjected to flame-retardant treatment.

6. The device according to claim 1, further comprising:

a hose connection port provided on one side of the forest fire spread prevention device, such that water is supplied or replenished to the inner space of the inner skin member through a hose from a water supply at the time of the forest fire.

7. The device according to claim 1, wherein the cylindrical bag of the outer skin member is formed when weaving the plain-woven mesh.

8. The device according to claim 1, wherein the cylindrical bag of the outer skin member is formed by rolling and sewing together ends of the plain-woven mesh.

9. A device for preventing the spread of forest fire, the device comprising:

an outer skin member which is woven with a thermoplastic plastic tape having a melting point of 160 to 280° C. as a weft and a warp, the outer skin member having a texture obtained by weaving a weft tape and a warp tape; and an inner skin member of a cylindrical container which is accommodated in the outer skin member and formed in a film shape prepared by extruding a thermoplastic plastic material having a thickness of 15 to 50 microns and a melting point of 110 to 130° C., the cylindrical container having an inner space configured to be filled with water, wherein the texture of the outer skin member is a twill-weave mesh in which three or more warp and weft threads are intersected up and down, the twill-weave mesh forming a cylindrical bag with a space to accommodate the inner skin member, wherein the inner skin member is seamlessly and continuously extruded into a cylindrical shape over a circumferential direction, wherein the inner skin member is divided into a first portion that is subject to flame-retardant treatment and a second portion that is not subject to flame-retardant treatment, and wherein, when the melting point of the inner skin member is reached, the second portion is melted to form a plurality of holes in a matrix shape at a predetermined interval for spraying the water from the inner skin member, and the first portion is not melted, such that the inner skin member is maintained as a cylindrical body while the water is sprayed through the plurality of hole serving as water jets.

10. The device according to claim 9, wherein the cylindrical bag of the outer skin member is formed when weaving the twill-weave mesh.

11. The device according to claim 9, wherein the cylindrical bag of the outer skin member is formed by rolling and sewing together ends of the twill-weave mesh.

* * * * *